July 22, 1969   H. E. MAYHEW, JR., ET AL   3,456,908
METHOD AND PENDANT SYSTEM FOR ARRESTING AIRCRAFT
Filed July 27, 1967   2 Sheets-Sheet 1

United States Patent Office 3,456,908
Patented July 22, 1969

3,456,908
METHOD AND PENDANT SYSTEM FOR ARRESTING AIRCRAFT
Harry E. Mayhew, Jr., Windermere, Wilmington, Del., and Meredith C. Wardle, Chadds Ford, Pa., assignors to All American Engineering Company, Wilmington, Del., a corporation of Delaware
Filed July 27, 1967, Ser. No. 656,484
Int. Cl. B64f *1/14*
U.S. Cl. 244—110                        9 Claims

ABSTRACT OF THE DISCLOSURE

Runway or deck pendant for arresting aircraft, which is capable of self-lubrication and high elongation without breaking. The nominal size of the pendant may be larger than the throat of the hook. The high elongation of the pendant and its self-lubrication facilitate engagement of the pendant in the hook and prolongs their service life. The pendant may be made of braided nylon and advantageously double-braided nylon.

Background of the invention

Twisted wire cable is conventionally used for the pendant of aircraft arresting gear. The hooks connected to the aircraft for engaging such pendants generally have a throat size a little larger than that of the cable to accommodate the slight flattening of the cable as it is engaged by the hook. Various experiments have been conducted to determine whether a linear element having greater elongation than steel, such as nylon rope, could improve the operating characteristics of an aircraft arresting system. Such experiments have been somewhat successful but have displayed drawbacks which have discouraged the adoption of nylon pendants.

One difficulty is the relatively greater size of nylon rope necessary to withstand the applied forces. The heretofore prevalent viewpoint that the hook must be a little larger or substantially match the size of the pendant made it appear that the use of a nylon pendant would require larger hooks on aircraft than those for use with wire cable pendants. Such lack of uniformity would be highly undesirable. The line of load action on a larger hook is also farther away from the shank of the hook which undesirably magnifies stresses imposed and the weight and mass of the hook. It was also believed that nylon would not hold up under lateral slippage of the hook across it, which would immediately fray and abrade it.

An object of this invention is to provide a method, system and pendant for arresting aircraft which is capable of highly efficient operation and long service life, particularly at high speeds of arrestment.

Another object is to provide such a method, system and pendant utilizing a nylon rope.

Summary

In accordance with this invention a pendant of textile fibers, such as nylon, capable of self-lubrication and relatively high elongation without breaking is engaged by a hook connected to the aircraft. A braided nylon pendant and more particularly double-braided are particularly advantageous. The nominal size of the pendant may be substantially larger than the throat size of the hook and still operate effectively with it. The throat size of the hook may advantageously be ¾ the nominal size of the pendant. This permits the larger required size of nylon pendant to be substituted for existing steel cable without increasing the throat size and effective loading moment of existing aircraft hooks originally intended for engagement with the steel wire rope. There is also the advantage that softer and lighter hook materials can be used wih nylon.

Brief description of the drawing

Novel features and advantages of the present invention will become apparent to one skilled in the art from a reading of the following description in conjunction with the accompanying drawings wherein similar reference characters refer to similar parts and in which.

Description of the preferred embodiment

Figure 1:
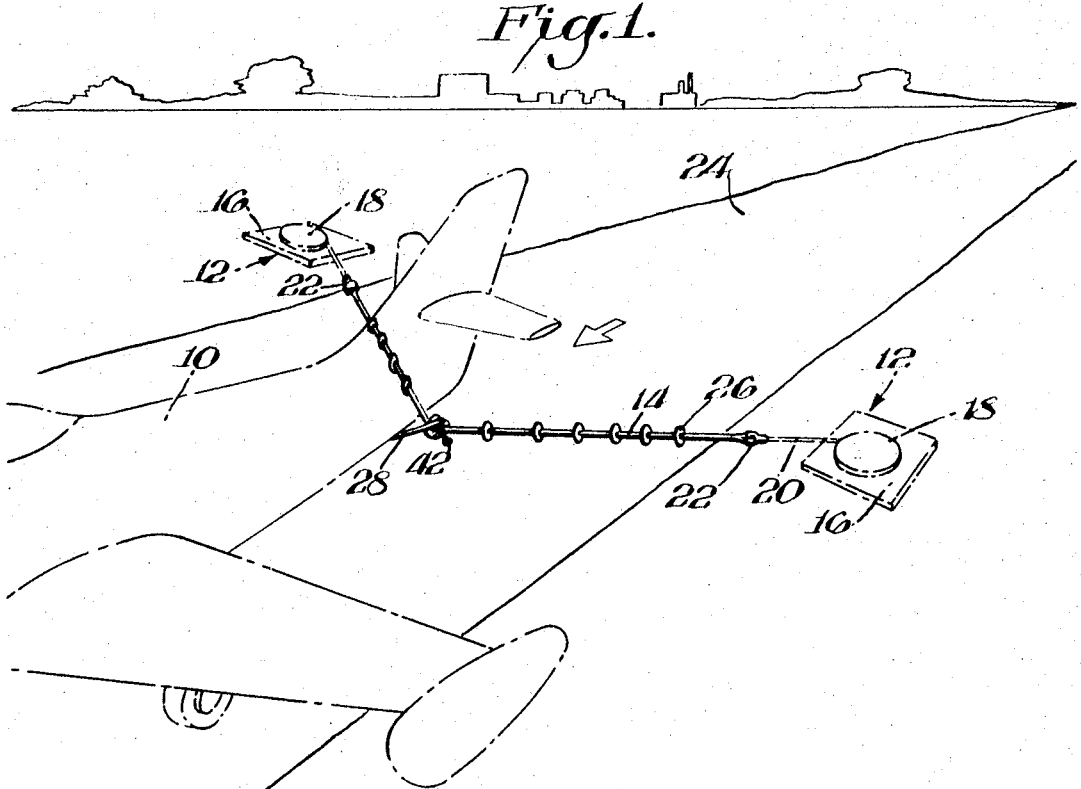
FIG. 1 is a three-dimensional representation of one embodiment of this invention being utilized for arresting a landing aircraft.
Figure 3:
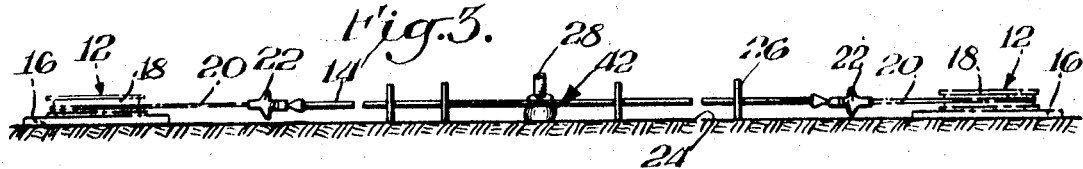
FIG. 3 is a front view of the engagement shown in FIG. 2.

In FIG. 1 is shown a landing aircraft 10 being arrested by a system 12 including cross-runway pendant 14 connected to energy absorbers 16, which are for example of the type described in U.S. Patent 3,172,625 or in copending commonly assigned application for U.S. Patent, Ser. No. 632,289, filed Apr. 20, 1967 (AAE W–139). Pendant 14 is connected to reels 18 of energy absorber 16 by linear payout elements 20 which are for example, made of nylon tape as described in aforementioned U.S. Patent 3,172,625 or steel cable as described in aforementioned commonly assigned application for U.S. Patent Ser. No. 632,289, filed Apr. 20, 1967 (AAE W–139). Pendant 14 is connected to payout lines 20 by connectors 22 and is supported above the surface of runway 24 by discs 26 of the type described in U.S. Patent 3,010,683. These discs 26 shown in FIGS. 3 and 4 maintain pendant 14 raised sufficiently above the runway to facilitate its engagement within hook 28 connected to the rear of aircraft 10.

Figure 5:
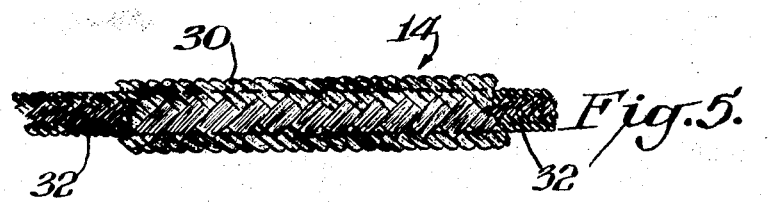
FIG. 5 is a cross-sectional view showing the structure of the pendant shown in FIGS. 1–4.

Pendant 14 is made of textile fibers, such as nylon capable of high elongation (approximately 15 to 30%) without breaking. A particularly effective form of such nylon rope is shown in FIG. 5 to be of double-braided construction including an outer sleeve 30 and an inner core 32. Such a double-braided rope is described on pages 142–147 of the June 1964 issue of Popular Science. For reasons which are not completely understood, such a rope is particularly effective for the service described herein.

The size of throat 34 on hook 28 depends upon the weight and operating characteristics of the particular aircraft to which it is connected. A relatively common size for such hooks prevalently used on carrier based aircraft has a throat diameter of approximately 1½ inches. This accommodates the flattening of the 1⅜ inch diameter wire cable pendant utilized on aircraft carriers upon engagement by the hook.

Pendant 14 has a nominal diameter of 2 inches to make it interchangeable with the aforementioned 1⅜ inch diameter steel wire runway pendant. This means the throat size of hook 28 is approximately ¾ the nominal size of pendant 14 or, in other words, the nominal size of pendant 14 is approximately 1⅓ the size of the throat of the hook. The aforementioned relationship may somewhat vary with the pendant having a nominal size ranging approximately 1¼ to 1½ times the throat size of the hook.

Figure 2:
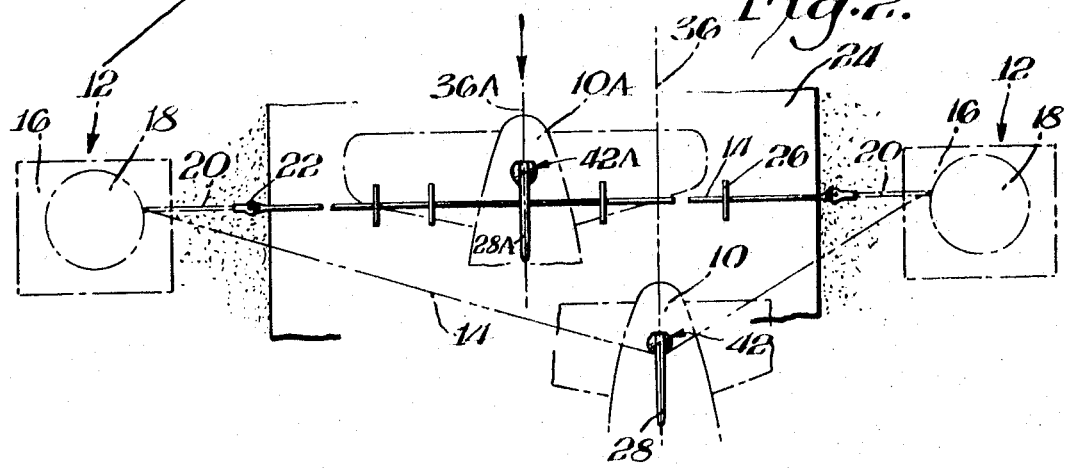
FIG. 2 is a top plan view of the tail of the aircraft shown in FIG. 1 in two phases of operation engaging the cross-runway pendant shown therein.

These relationships provide a system which is particularly dependable and effective for arresting aircraft and having relatively high energy absorbing characteristics and prolonged service life. As shown in FIGS. 1 and 2, aircraft 10 slides toward the effective operating centerline of pendant 14 after an initial off-center engagement illustrated by the position of the aircraft designated 10A. If for example, line or engagement 36A of aircraft 10A is approximately thirty feet off from the effective centerline between energy absorbers 16, aircraft 10 will slip laterally about ten feet to its ultimate operating line of motion 36. This lateral slip tends to fray and abrade the pendant and hook throat. Heretofore the surface of the hooks have therefore been specially hardened and coated with wear resistant materials.

It is current practice to limit the use of a wire rope pendant to not more than one arrestment over 160 knots, no more than 10 at between 150 and 160 knots and no more than 15 at any speed. It was heretofore believed that a synthetic textile fiber pendant like nylon would be highly prone to damage and have insufficient service life to justify its use in aircraft arresting systems. It has been unexpectedly found that the use of nylon rope of the type described herein operates successfully with prolonged service life. A nylon pendant as described herein withstands more than 25 arrestments at 175 knots, about 30 at 160 knots and about 50 at 130 knots.

Figure 4:
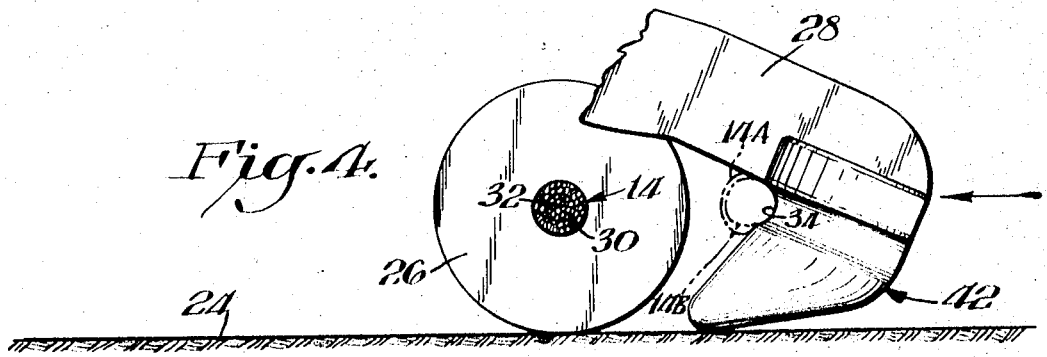
FIG. 4 is a view in cross section similar to FIG. 3 in several successive phases of action.

The force of arrestment causes nylon rope 14 to reduce in cross section as shown in FIG. 4. The condition at initial impact in FIG. 4 is designated 14A and the ultimately reduced cross section of pendant 14 is designated 14B. This contrasts with the flattening of steel cable to a substantially larger dimension under such conditions. A 2 inch nominal diameter nylon rope of the type shown in FIG. 5 thus is accommodated within the 1½ inch throat size hook shown in FIG. 4.

Figure 6:
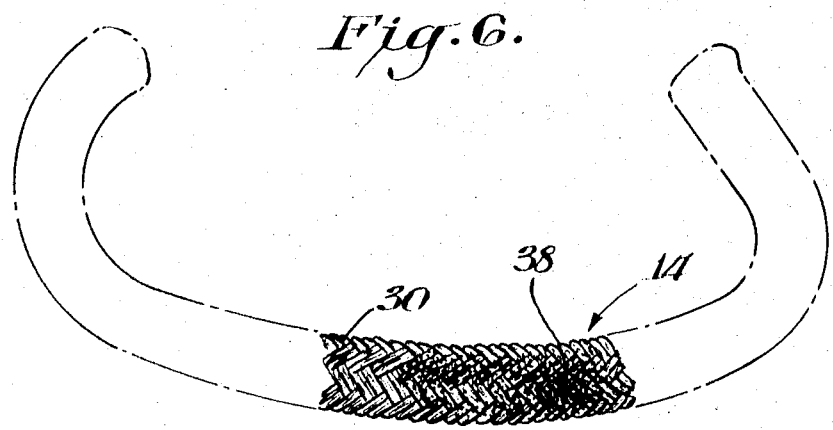
FIG. 6 is a three-dimensional view of a portion of the pendant shown in FIG. 5 after engagement with a hook as shown in FIGS. 1–4.

For reasons which are not completely understood, lateral slippage of hook 28 relative to pendant 14 merely produces a thin film 38, illustrated in FIG. 6, on the surface of pendant 14. Film 38 results from the melted surface of nylon pendant 14 where it has been wiped by the hook. The pendant is not damaged and its surface merely appears as if it had been varnished or shellacked. This fused or glazed surface 38 does not impair the usefulness of pendant 14 for successive engagements. The bulging of the larger pendant about the smaller hook might help increase the area of wiping contact and unexpectedly minimize wear. The relatively smooth outer surface of the braided nylon pendant might also contribute to its preservation.

Figure 7:
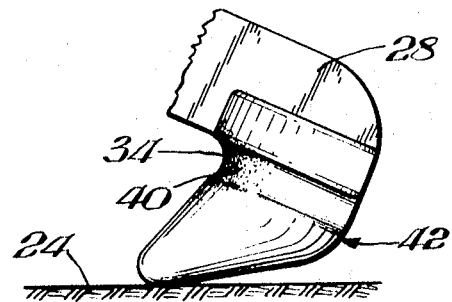
FIG. 7 is a three-dimensional view showing the throat of the hook of FIGS. 1–4 after engagement with the pendant as shown in FIGS. 1–4.

As shown in FIG. 7, such wiping also applies a film or glaze 40 on throat 34 of hook 28. This coating does not damage the hook and might even help facilitate further engagements and slippage relative to pendant 14 by the lubrication provided thereby. This unexpectedly improves the service life of the hook, which is subject to severe abrasion and rough treatment when used in conjunction with the conventional steel wire rope pendant. It is therefore no longer necessary to coat throat 34 of hook 28 with a hard wear-resistant surface, which saves considerable expense and trouble. A nylon pendant even makes it possible to substitute lighter and softer metals, such as aluminum or magnesium for the former high strength steel hook points required for use with steel wire rope pendants. This facilitates fabrication of the hook points and minimizes hook bounce upon the runway, which is very critical to efficient and dependable engagement. Since nylon doesn't bite into the hook, as does steel wire cable, the hook cross section can be safely reduced. The use of softer metal also reciprocally minimizes wear upon the pendant. The ultimate advantages are therefore remarkably cumulative. This is especially so when hook point 42 shown in FIG. 4 is made of aluminum.

Tests performed with the system described in this application have demonstrated substantial reduction in initial and maximum hook loads relative to corresponding systems utilizing steel wire rope. Initial hook loads at velocities ranging from approximately 120–145 knots have demonstrated a reduction in initial hook load to a value of from 60 to 75% of the wire rope hook loads and a reduction of ultimate hook loads to a value of from approximately 60 to 80% of the wire rope hook loads. The pendant and hooks have withstood many more successive arrestments throughout the tests than with wire cable, particularly at high speed as previously discussed.

In addition, the use of the system of this invention has substantially reduced dynamic oscillations and minimized slamming of the pendant into the runway. This has minimized the breakage of connecting links. Such tests have also indicated that the operating tensions applied to the pendant during 160 knot arrestments would be less than one-half the ultimate strength of the pendant and the force applied to the linear payout elements would be below 30% of the breaking strength of nylon tape payout elements. These values represent significant reductions from the loads normally experienced by the arresting gear used in the tests.

The term pendant as used herein means the portion of an aircraft arresting system which is engaged by the aircraft or an appendage, such as a hook, to arrest its movement. It is sometimes called a runway pendant when used on the runaway of a landing field and a deck pendant when used on the deck of a naval aircraft carrier.

We claim:

1. In a system for arresting aircraft including a pendant engaged by a hook upon said aircraft and which is connected to an energy system by payout lines, the improvement comprising a pendant of textile fibers capable of self-lubrication and relatively high elongation without breaking, said hook having a throat size substantially smaller than the nominal size of said pendant, and said elongation of said pendant and its self-lubrication accommodating said pendant to said hook and causing lateral slippage of said hook toward the effective operating centerline of said pendant whereby operation is facilitated and said hook and pendant are preserved.

2. In a system as set forth in claim 1 the improvement wherein said pendant is braided.

3. In a system as set forth in claim 2 the improvement wherein said pendant is double braided.

4. In a system as set forth in claim 3 the improvement wherein said double braided pendant is nylon.

5. In a system as set forth in claim 1 the improvement wherein said hook is made of a relatively light and soft material.

6. In a system as set forth in claim 5 the improvement wherein said hook is made of aluminum.

7. In a system as set forth in claim 1 the improvement wherein said pendant is nylon.

8. In a system as set forth in claim 1 the improvement wherein said pendant is capable of elongating 15 to 30% of its original length without breaking.

9. In a system as set forth in claim 1 the improvement wherein said throat size of said hook is approximately ¾ the nominal size of said pendant.

References Cited

UNITED STATES PATENTS

| | | | |
|---|---|---|---|
| 3,419,231 | 12/1968 | McDermott et al. | 244—110 |
| 2,979,292 | 4/1961 | Cruger | 244—110 |
| 3,045,958 | 7/1962 | Mackie | 244—110 |
| 3,093,352 | 6/1963 | Hoffstrom | 244—110 |
| 3,139,249 | 6/1964 | Trifillis | 244—110 |
| 3,392,939 | 7/1968 | Cruger et al. | 244—110 |

OTHER REFERENCES

Popular Science, June 1964, pages 142 to 148, "Amazing Plastic Ropes—They Splice Themselves," by George Daniels.

MILTON BUCHLER, Primary Examiner

PAUL E. SAUBERER, Assistant Examiner